(12) United States Patent
Krishnan et al.

(10) Patent No.: US 8,266,389 B2
(45) Date of Patent: Sep. 11, 2012

(54) HIERARCHICAL MEMORY ARBITRATION TECHNIQUE FOR DISPARATE SOURCES

(75) Inventors: Guhan Krishnan, Chelmsford, MA (US); Antonio Asaro, Toronto (CA); Don Cherepacha, Oakville (CA); Thomas R. Kunjan, Sunnyvale, CA (US); Joerg Winkler, Ullerdorf (DE); Ralf Flemming, Dresden (DE); Maurice B. Steinman, Malborough, MA (US); Jonathan Owen, Northborough, MA (US); John Kalamatianos, Arlington, MA (US)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 551 days.

(21) Appl. No.: 12/431,874

(22) Filed: Apr. 29, 2009

(65) Prior Publication Data
US 2010/0281231 A1 Nov. 4, 2010

(51) Int. Cl.
*G06F 13/18* (2006.01)
(52) U.S. Cl. ........ 711/151; 711/147; 711/158; 711/168; 711/169; 710/243; 710/244
(58) Field of Classification Search .................. 711/151, 711/147, 168, 169, 167, 158; 710/243, 244, 710/240
See application file for complete search history.

(56) References Cited

U.S. PATENT DOCUMENTS

| | | | |
|---|---|---|---|
| 6,092,158 A | 7/2000 | Harriman et al. | |
| 6,487,640 B1 * | 11/2002 | Lipasti | 711/140 |
| 7,210,018 B2 * | 4/2007 | DeSota et al. | 711/169 |
| 7,698,498 B2 * | 4/2010 | Lakshmanamurthy et al. | 711/105 |
| 2002/0188811 A1 | 12/2002 | Ma et al. | |
| 2007/0156946 A1 | 7/2007 | Lakshmanamurthy et al. | |

OTHER PUBLICATIONS

International Search Report and Written Opinion mailed Jul. 26, 2010 in App. No. PCT/US2010/032343, 7 pages.

* cited by examiner

*Primary Examiner* — Andrew Q Tran
(74) *Attorney, Agent, or Firm* — Zagorin O'Brien Graham LLP

(57) ABSTRACT

A hierarchical memory request stream arbitration technique merges coherent memory request streams from multiple memory request sources and arbitrates the merged coherent memory request stream with requests from a non-coherent memory request stream. In at least one embodiment of the invention, a method of generating a merged memory request stream from a plurality of memory request streams includes merging coherent memory requests into a first serial memory request stream. The method includes selecting, by a memory controller circuit, a memory request for placement in the merged memory request stream from at least the first serial memory request stream and a merged non-coherent request stream. The merged non-coherent memory request stream is at least partially based on an indicator of a previous memory request selected for placement in the merged memory request stream.

24 Claims, 3 Drawing Sheets

HIERARCHICAL MEMORY ARBITRATION TECHNIQUE FOR DISPARATE SOURCES

BACKGROUND

1. Field of the Invention

This invention relates to integrated circuits and more particularly to techniques for scheduling memory requests to a memory.

2. Description of the Related Art

Referring to FIG. 1, an exemplary system-on-a-chip (i.e., SoC 102) includes multiple central processing units (i.e., CPUs, e.g., CPU0 104, CPU1 106, . . . , CPUN 108) that issue memory requests through an interface (e.g., interface A) to an integrated memory controller (e.g., DRAM controller 130). The integrated memory controller enforces system coherence and serves as a conduit to a shared memory space (e.g., DRAM 114). A specialized memory requestor, for example, a graphics processing unit (e.g., GPU 140) issues memory requests (e.g., direct memory access requests, i.e., DMA requests) to an interface of the integrated memory controller (e.g., interface B), and receives responses from that interface of the integrated memory controller. A typical DRAM controller 130 supports coherent traffic, i.e., a memory coherency protocol is implemented to maintain consistency between the copies of data accessed by CPU, I/O, and GPU requests. A typical arbitration scheme combines memory request streams in the SoC pipeline using a priority-based arbitration scheme that chooses between different request streams to schedule commands on the memory bus. Such scheduling of memory requests from those multiple requestors affects memory latency and memory bandwidth realized for each requesting source on the memory bus.

SUMMARY

A hierarchical memory request stream arbitration technique merges coherent memory request streams from multiple memory request sources and arbitrates the merged coherent memory request stream with requests from a non-coherent memory request stream. In at least one embodiment of the invention, a method of generating a merged memory request stream from a plurality of memory request streams includes merging coherent memory requests into a first serial memory request stream. The method includes selecting, by a memory controller circuit, a memory request for placement in the merged memory request stream from at least the first serial memory request stream and a merged non-coherent request stream. The merged non-coherent memory request stream is at least partially based on an indicator of a previous memory request selected for placement in the merged memory request stream.

In at least one embodiment of the invention, an apparatus includes an arbitration unit configured to merge a plurality of coherent memory request streams received from a first plurality of memory requesting agents into at least a first coherent memory request stream. The apparatus includes a memory controller unit configured to select a memory request for placement in a merged memory request stream from a merged non-coherent request stream and a first serial memory request stream based on the first coherent memory request stream. The merged non-coherent memory request stream is at least partially based on an indicator of a previous memory request selected for placement in the merged memory request stream.

In at least one embodiment of the invention, a system includes a plurality of coherent memory requesters configured to issue a plurality of coherent memory request streams and a graphics processing unit configured to issue at least one coherent memory request stream and at least one non-coherent memory request stream. The graphics processing unit includes an input/output engine configured to issue the at least one coherent memory request stream. The graphics processing unit includes a graphics memory arbiter configured to issue a merged non-coherent request stream at least partially based on an indicator of a previous memory request selected for placement in a merged memory request stream. The system includes an integrated memory controller configured to hierarchically arbitrate memory requests and generate the merged memory request stream from the plurality of coherent memory request streams, the at least one coherent memory request stream, and the merged non-coherent request stream.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
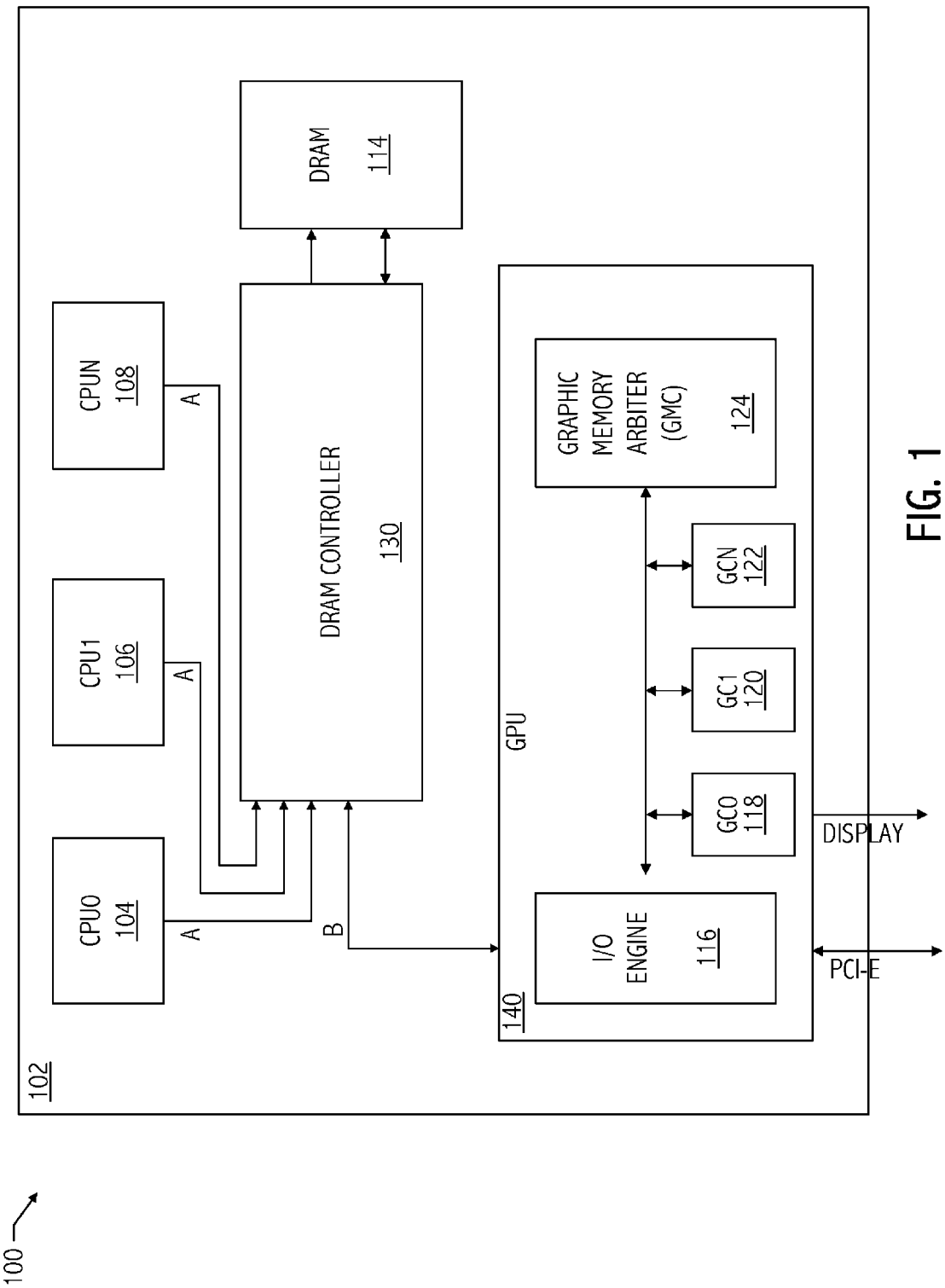
FIG. 1 illustrates an exemplary system-on-a-chip (SoC).

In general, graphics processing unit (e.g., GPU 140 of FIG. 1) memory requests include non-coherent memory requests and frequently require higher memory bandwidth than CPU memory requests. A typical DRAM controller 130 re-orders a highly regular pattern of requests generated by the GPU and received via interface B into a lengthy pipeline of memory requests. Thus, the memory requests generated by GPU 140 may lose their page locality in SoC 102. In addition, to sustain peak transactional bandwidths, SoC 102 of FIG. 1 requires buffering in the GPU 140. An SoC disclosed herein achieves improved throughput as compared to SoC 102 by providing requests to a final selection stage of SoC 202, rather than to a system serialization point (e.g., a front-end of DRAM controller 130 of SoC 102).

Figure 2:
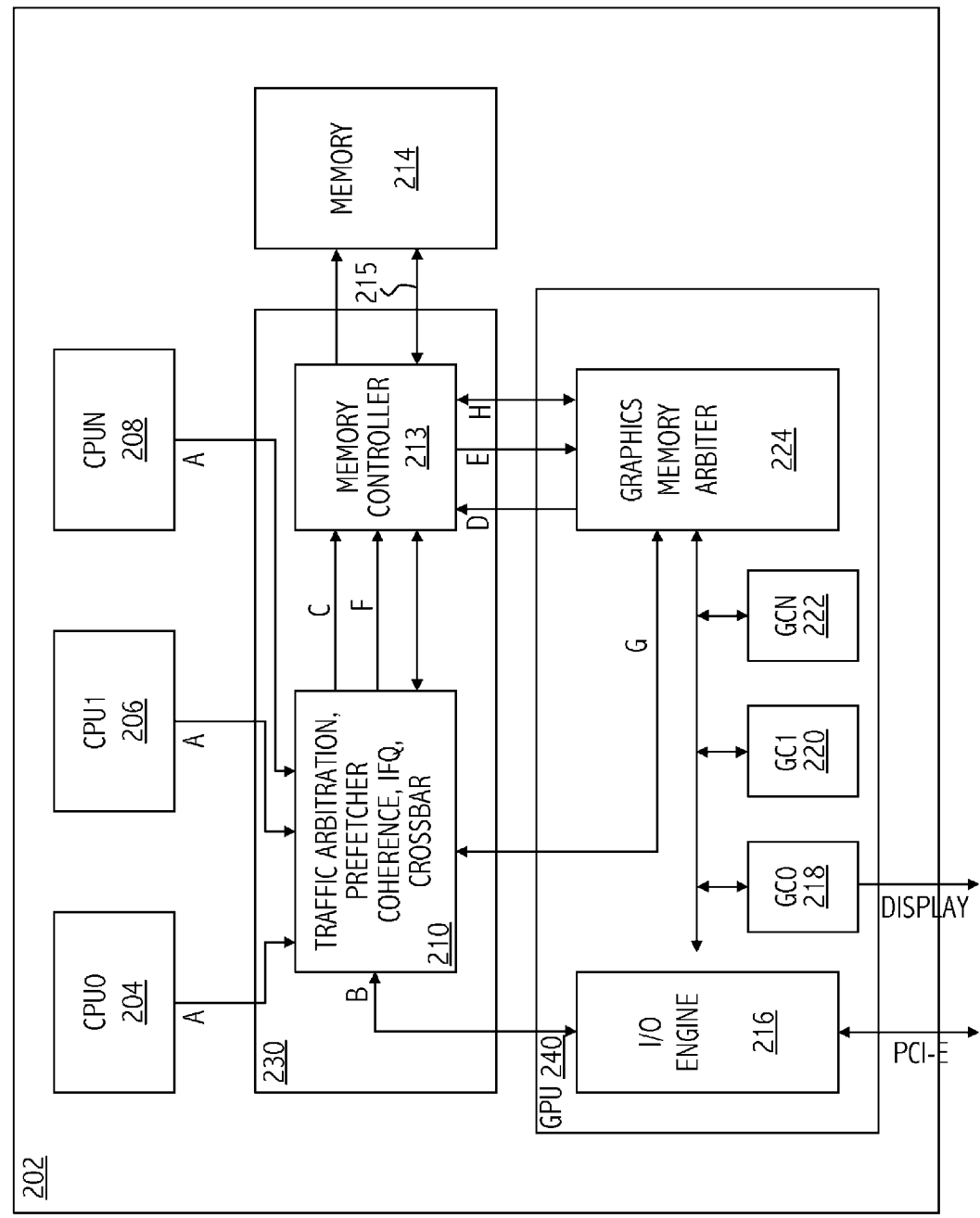
FIG. 2 illustrates an exemplary SoC consistent with at least one embodiment of the invention.

Referring to FIG. 2, an exemplary system-on-a-chip (e.g., SoC 202) includes multiple central processing units (i.e., CPUs, e.g., CPU0 204, CPU1 206, CPUN 208), which issue memory requests through interface A to a hierarchical integrated memory controller (e.g., hierarchical integrated memory controller 230). Hierarchical integrated memory controller 230 enforces system coherence and serves as a conduit to a shared memory space (e.g., memory 214). In at least one embodiment of SoC 202, memory 214 is a double data-rate-two or double-data-rate-three synchronous dynamic random access memory (i.e., DDR2/3 DRAM), although other suitable memory structures may be used. An I/O engine (e.g., I/O engine 216) issues memory requests and receives responses from the integrated memory controller through interface B. Both CPU and direct memory access (i.e., DMA) requests from the I/O engine must be coherent with the CPU requests. Accordingly, the CPU and DMA requests are merged at a system coherence point in hierarchical integrated memory controller 230 before being issued to a memory controller (e.g., memory controller 213) via interface C. In addition, hierarchical integrated memory controller 230 includes logic that analyzes incoming memory requests from the CPUs and the I/O engine to predict future memory accesses and issue speculative memory read requests (i.e., prefetches) to the memory controller through interface F. Requests issued through interfaces C and F are coherent memory streams.

In at least one embodiment, SoC 202 includes a specialized processing unit, e.g., graphics processing unit 240, which is a dedicated graphics rendering device that efficiently manipulates computer graphics information. In at least one embodiment of SoC 202, graphics processing unit 240 (i.e., GPU 240) includes several memory requesting agents (e.g., GC0 218, GC1 220, GCN 222), each of which is associated with a separate queue of non-coherent memory requests. Note that GPU 240 may include any suitable number of memory requesting agents. A graphics memory request scheduler (e.g., graphics memory arbiter 224) combines non-coherent memory requests from different requesting agents into a single non-coherent stream of requests. The graphics memory arbiter 224 issues those requests from the single non-coherent stream to memory controller 213 via interface D.

Hierarchical integrated memory controller 230 implements a hierarchical memory request stream arbitration technique. Hierarchical integrated memory controller 230 merges multiple coherent memory request streams from multiple memory request sources and arbitrates the merged coherent memory request stream with requests from a non-coherent memory request stream. Hierarchical integrated memory controller 230 merges memory request streams based on properties associated with individual memory request streams. In at least one embodiment of SoC 202, coherent memory requests from the CPUs or from the I/O engine on interface C do not require peak memory bandwidth. In addition, those coherent memory requests typically do not generate predictable bank read/write access patterns. That is, CPU and I/O read or write requests typically have random arrival rates and access multiple memory banks simultaneously. However, CPU performance is sensitive to latency of read requests on this interface because those read requests provide data back to pending loads in the CPU. Graphics processing unit 240 is a high bandwidth request source. Thus, memory controller 213 merges requests from interfaces C and D to increase memory bus utilization for bandwidth sensitive requesters and to reduce the average latency for latency sensitive requesters. A second set of scheduling policies is applied to each of the merged coherent memory request stream and a merged non-coherent memory request stream that are intended to increase bandwidth on the memory bus and reduce latency experienced by certain request types and/or request sources. Accordingly, hierarchical integrated memory controller 230 handles the non-coherent memory requests from GPU 240 differently from the coherent memory requests, e.g., to guarantee screen update without flicker.

In at least one embodiment, hierarchical integrated memory controller 230 uses an arbitration scheme that treats coherent and non-coherent request sources as separate entities and uses feedback to influence intra-source arbitration. For example, a next memory request issued to a merged memory request queue is determined using knowledge of the global pick, i.e., an indicator of the most recent memory request issued to the merged memory request queue, e.g., communicated to GPU 240 via interface H. Feedback regarding memory system bank status from a final arbitration stage is used by both the coherent request sources and the non-coherent request source to influence picking requests from their respective request queues. The memory bank status information increases the ability of a graphics memory arbiter (e.g., graphics memory arbiter 224) to select requests that result in page hits from requests in its internal queues. In at least one embodiment, hierarchical integrated memory controller 230 uses page ownership rules to reduce a number of page conflicts on memory bus 215. In at least one embodiment, hierarchical integrated memory controller 230 uses bus turnaround rules to decrease the penalties incurred on a memory bus when switching the data bus from a read transaction to a write transaction and vice versa. In at least one embodiment, hierarchical integrated memory controller 230 uses limits on outstanding memory bandwidth to any particular request source to thereby provide an upper limit on the service time experienced by other memory requesters in the system.

Figure 3:
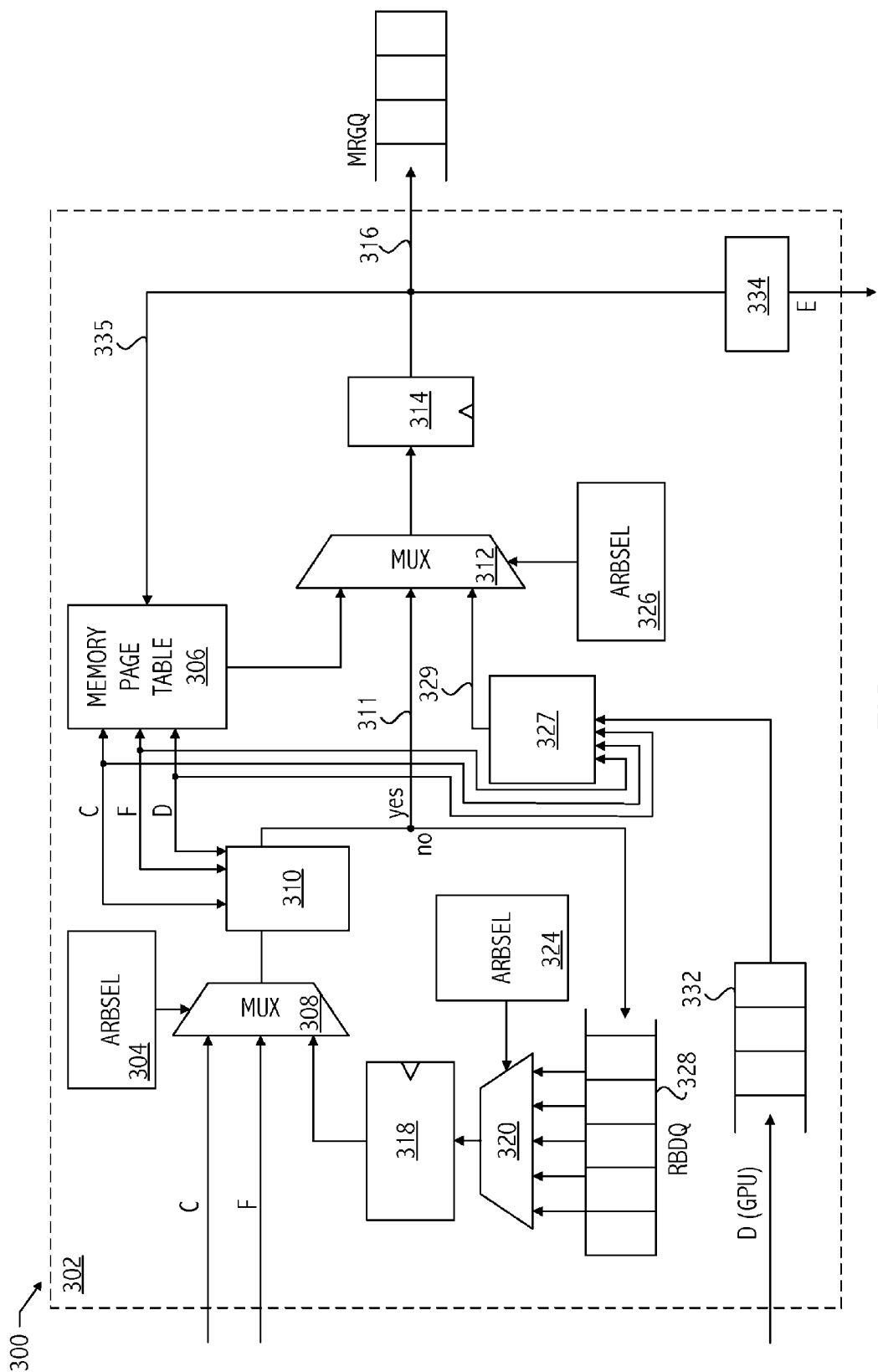
FIG. 3 illustrates an exemplary portion of a memory controller of the SoC of FIG. 2, consistent with at least one embodiment of the invention.

In at least one embodiment of SoC 202, memory controller 213 includes a hierarchical merge multiplexer. Referring to FIG. 3, hierarchical merge multiplexer 302 merges streams received from interfaces C, F, and D into a single unified stream of memory requests (e.g., merged memory request stream 316), which are queued in the merged memory request register (i.e., MRGQ) for issuance to memory 214 by memory controller 213 via memory bus 215. Although only one hierarchical merge multiplexer 302 and MRGQ are illustrated for a memory channel, note that in at least one embodiment, SoC 202 includes multiple memory channels (not shown). Accordingly, a corresponding hierarchical merge multiplexer and a corresponding MRGQ are included for each memory channel. Memory request streams C, F, and D include memory channel information and memory requests are demultiplexed to individual hierarchical merge multiplexers and MRGQs according to the memory channel information included in individual memory requests.

In at least one embodiment of hierarchical merge multiplexer 302, multiplexers 308, 320, and 312 receive corresponding select signals from respective arbitration logic, e.g., ARBSEL 304, ARBSEL 324, and ARBSEL 326, respectively. ARBSEL 304 controls the selection of coherent requests by multiplexer 308, e.g., from CPU or I/O requests from interface C, speculative coherent requests from interface F, and queued coherent requests from state element 318.

Referring to FIG. 2 and FIG. 3, in at least one embodiment of hierarchical merge multiplexer 302, ARBSEL 304 and the graphics memory arbiter 224 schedule requests to achieve as many page hits as possible based on memory bank status provided by memory page table 306, which includes information regarding previous memory requests selected for placement in the merged memory request queue (MRGQ). Memory page table 306 maintains an open or closed status for all chip-selects and banks in memory system 214. For open pages of memory system 214, memory page table 306 includes an identifier of which row of the page is open. Each time multiplexer 312 grants a request, a corresponding chip-select and bank status is updated in memory page table 306 based on an indicator of the memory request selected for placement in the merged memory request queue (e.g., signal 335). Via interface E, graphics memory arbiter 224 receives an indicator of memory requests selected for placement in the merged memory request queue, which is stored in block 334.

In at least one embodiment of memory controller 213, the following information is provided to graphics memory arbiter 224 over interface E.

TABLE 1

Information transmitted on interface E

| Field | Comments |
| --- | --- |
| Chip Select | The DRAM chip select or CS the request granted by Multiplexer 312 is targeting |
| Bank | The DRAM bank the request granted by Multiplexer 312 is targeting |
| Command | See Table 2 |
| Row | Row number of the DRAM page opened on the specified CS and bank |
| Source | 1 = GPU, 0 = CPU/I/O |

TABLE 2

Commands on interface E

| Command | Comments |
| --- | --- |
| 1 | precharge |
| 2 | [0 = read, 1 = write] |
| 3 | [0 = read, 1 = write] followed by an immediate AutoPrecharge to close the bank. |
| 4 | activate bank followed by a [0 = read, 1 = write] |
| 5 | precharge to close a previously opened page, activate the new page followed by [0 = read, 1 = write] |
| 6 | activate bank followed by a [0 = read, 1 = write] to the bank and an immediate autoprecharge to close the bank |
| 7 | precharge to close a previously opened page, activate the new page followed by [0 = read, 1 = write] and then autoprecharge to close the newly opened page |

Accordingly, both a front-end request stream (i.e., request stream 311), which is based on the requests selected by multiplexer 308, and the GPU request stream are able to issue requests that favor page hits over page misses and over page conflicts.

Referring back to FIG. 3, in at least one embodiment of hierarchical merge multiplexer 302, ARBSEL 324 controls the selection of requests by multiplexer 320 from at least a portion of the contents of retry queue RBDQ 328. Any suitable selection technique may be used (e.g., first-in-first-out, oldest ready, techniques based on page status and priority to increase bandwidth and decrease latency, etc.). In at least one embodiment of hierarchical merge multiplexer 302, state element 318 stores the output of multiplexer 320 to provide suitable timing characteristics.

In at least one embodiment of hierarchical merge multiplexer 302, each request of a request stream provided to multiplexer 312 is associated with a priority value (e.g., urgent, high, medium, or low). ARBSEL 326 implements an additional priority policy based on general characteristics of input request streams received by multiplexer 312. For example, CPU and I/O requests have greater sensitivity to latency and limited bandwidth requests as compared to GPU requests, which typically require greater bandwidth and have lower sensitivity to latency. Therefore, in at least one embodiment, ARBSEL 326 prioritizes requests in request stream 311 over GPU requests of equal priority in request stream 329. In at least one embodiment, ARBSEL 326 enforces priority in the following order: urgent request stream 329, high request stream 311, high request stream 329, medium request stream 311, medium request stream 329, low request stream 311, and low request stream 329.

In at least one embodiment of hierarchical merge multiplexer 302, control blocks 310 and 327 determine eligibility of requests from multiplexer 308 and queue 332, respectively, based on page ownership, read/write turnaround, and bandwidth control policies. Note that one or more other policies may be implemented by control blocks 310 and 327. Control blocks 310 and 327 determine the eligibility for arbitration of memory requests received from interfaces C, F, and D according to data received from memory page table 306 corresponding to those memory requests. If eligible for arbitration, requests selected by multiplexer 308 are forwarded to multiplexer 312 in request stream 311. In at least one embodiment of hierarchical merge multiplexer 302, if a request selected by multiplexer 308 is not eligible for arbitration, the request is not provided to multiplexer 308 on the request stream 311 line, but rather is stored in retry queue RBDQ 328. If eligible for arbitration, the request from queue 332 is forwarded to multiplexer 312 as the request stream 329. If the request from queue 332 is not eligible for arbitration, the request is not provided to multiplexer 312 on the request stream 329 line, but rather remains in queue 332.

Page Ownership Rules

When different request sources in the system try to access a chip-select and bank pair on a memory channel, but do so to different rows, a page conflict occurs. In at least one embodiment of hierarchical merge multiplexer 302, control block 327 attempts to reduce the number of page conflicts issued to the memory bus. For example, control block 327 prevents a request sequence that allows a CPU to open and read from page 0 in a chip-select and bank pair and then let the GPU close page 0 and open and read from page 1 to the same chip-select and bank pair, and then allow a CPU to close page 1 and read from page 0 again. That sequence schedules repeated page conflicts on the memory bus. Instead, control block 327 tracks the source that last opened the page for each chip-select and bank pairs in the memory channel and stores this information in memory page table 306. When a request source that is not the owner of the bank (e.g., a CPU was the last source to open the page in memory page table 306) tries to open a new page to a given chip-select and bank pair, control block 327 applies a set of rules that is used to decide when an ownership change is allowed. By applying that additional policy, a source is able to assert ownership of a page for a longer period of time in the presence of outstanding page conflicts from another source, thereby issuing more page hits from the old source before turning to the new source to make forward progress.

In at least one embodiment, control block 327 implements page ownership rules that are based on source priority and current page owner. For example, when CPU or I/O is the owner of a memory page, a programmable timer is used to bind that page to the CPU or I/O for a period of time. A cycle count used to determine the period of time varies according to the priority of the conflicting GPU request. For example, three sets of counters may be used, e.g., one counter is used for each of high, medium, and low priority GPU requests, with increased cycle count values for each request type. An urgent memory request causes the CPU to immediately relinquish ownership of the page. To ensure fairness to the colliding source, a counter is started when a page owner first opens a page and the counter is not extended when that first page owner continues to have page hits to the open row. In at least one embodiment of control block 327, a time window that a conflicting (e.g., GPU) request must wait before it can open a page that is already opened to a different row by another requester (e.g., CPU) is programmable for different priority levels (e.g., low, medium, high, and urgent priority levels).

In at least one embodiment of hierarchical merge multiplexer 302, when a GPU is the owner of a memory page, ownership is released when one of a variety of events occurs. For example, the ownership is released when a programmable number of requests of a given size and priority from GPU 240 has completed on the memory bus. That number of requests may vary with the priority (e.g., low, medium, or high) of the conflicting request (e.g., a request in request queue 311). The ownership may be released when the GPU asserts an end of burst indication indicating that the burst of requests to the page is completed. Ownership may also be released when the GPU switches from one chip-select, bank, and row, to a different chip-select, bank, and row on two consecutive requests, not necessarily in consecutive clock cycles. In addition, the ownership is released when a programmable counter that tracks the number of cycles since the GPU opened the page has expired. In at least one embodiment, hierarchical merge multiplexer 302 includes a set of counters depending on the priority of the blocked request. Note that the page ownership rules described herein are exemplary, and other embodiments of a hierarchical merge multiplexer may use other suitable page ownership rules.

Bus Turnaround Management

A bus turnaround occurs when a transaction of a first type (e.g., read or write) is followed by a transaction of a second type (e.g., write or read, respectively). Bus turnarounds can create multiple bubbles (i.e., penalties of multiple idle cycles) on the memory data bus due to timing parameters (e.g., DDR DIMM timing parameters for DRAM). Note that different memory speeds may have different bus turnaround times. In at least one embodiment of hierarchical merge multiplexer 302, ARBSEL 326 configures multiplexer 312 to merge traffic in a manner that reduces read-to-write and write-to-read bus turnarounds on the memory bus. In at least one embodiment, ARBSEL 326 groups together read issuances separately from write issuances to reduce the number of bus turnarounds. A set of time windows are based on programmable configurations according to requestor, request type, or priority class. Control block 327 keeps track of the current direction of the memory bus and when a requestor tries to change the direction of the bus, it has to wait for the particular time window to expire before it can be considered as an eligible requester. In at least one embodiment, control block 327 includes configuration registers corresponding to each traffic class that determine the timer window and specify when the particular traffic class must wait before it can turn around the bus. Exemplary configuration registers include an indicator of a number of control clocks or a number of bytes transferred that must occur before the particular traffic class can turn around the bus. Note that the bus turnaround rules described herein are exemplary, and other embodiments of a hierarchical merge multiplexer may use other suitable bus turnaround rules.

Request Source Bandwidth Control

To prevent any particular source from monopolizing memory bandwidth over a long period of time, SoC 202 limits the number of outstanding commands in the MRGQ from any given source. This is accomplished by maintaining counters on a per request source basis. In at least one embodiment of SoC 202, requests from interface C are limited, e.g., to a first number of bytes. Meanwhile, requests from interface D range up to a second number of bytes. Each time multiplexer 312 grants the bus to a request source, the corresponding counter is updated with the total number of bytes that are outstanding on the memory bus from that source. If a requestor presents a request when the counter for that source has exceeded the programmed threshold value, then the requestor is throttled back from being eligible for multiplexer 312 arbitration. This policy may enforce an upper limit for the latency seen from any other request source. In an exemplary SoC 202, request source bandwidth control ensures that display requests are serviced in a bounded amount of time. In at least one embodiment of SoC 202, two sets of configuration registers control the number of maximum byte read or write requests outstanding in the MRGQ. In at least one embodiment of SoC 202, separate throttle configuration registers, which are activated from each source, may be included for reads and writes.

As discussed above, GPU requests are generally considered non-coherent requests and frequently require high memory bandwidth. The GPU selects a best available request and provides it to hierarchical merge multiplexer 302 via interface D. Hierarchical merge multiplexer 302 stores the requests from the GPU in queue 332. Note that request stream 311 is selected independently from the graphics memory arbiter selection and that the selected graphics memory arbiter request has direct access to the multiplexer 312, which is the final selection stage. By providing the graphics memory arbiter request to the final selection stage, as in SoC 202, rather than at a system serialization point (e.g., the input of DRAM controller 130 of SoC 102 of FIG. 1) used by other memory request selection techniques, a high bandwidth GPU client achieves improved throughput over the throughput of SoC 102. System-on-a-chip 202 has improved throughput over SoC 102 because DRAM controller 130 re-orders the highly regular pattern of requests generated by the GPU into a lengthy pipeline. Thus, in SoC 102, the requests generated by GPU 140 lose their page locality. In addition, the SoC 102 requires additional resources in the traffic arbitration blocks of the integrated memory controller. To sustain peak DRAM data bandwidths, SoC 102 of FIG. 1 requires additional buffering in the GPU, as compared to SoC 202 of FIGS. 2 and 3.

Referring to FIGS. 2 and 3, since the GPU request stream bypasses interface C and the GPU requests are not stored with or picked against CPU or I/O requests from a unified queue, same address contentions are introduced in SoC 202 between request stream 329 and request stream 311, i.e., read-after-write hazards are introduced. Those read-after-write hazards between requests on interfaces C and D are accounted for by graphics memory arbiter 224, which ensures that there are no address collisions with addresses already dispatched on interface C through a check for GPU reads after CPU writes of an in-flight transaction queue stored in traffic arbitration block 210. In at least one embodiment of SoC 202, the check uses indicators provided by interface G, and is performed using any suitable hardware or software techniques. In general, since the address collisions are uncommon during system operation, hierarchical merge multiplexer 302 of FIG. 3 results in high bandwidth for GPU requests without compromising the low latency seen by CPU reads on interface C of SoC 202 of FIG. 2.

The SoC of FIGS. 2 and 3 is not a unified queuing structure, i.e., requests from CPU, I/O, and GPU are not selected out of a single queue. Thus, an SoC implementing the techniques described in FIGS. 2 and 3 can be physically partitioned to keep top-level modules, e.g., GPU and related sub-blocks, separate from other integrated memory controller logic. In addition, different top-level modules in SoC 202 can be clocked at different speeds, can implement different queuing structures to interface with each GPU client, and can have control and data path be independent of traffic arbitration and coherence pipelines in the front-end of the integrated memory controller. For example, hierarchical integrated memory controller 230 operates using a control clock signal having a first frequency and GPU 240 operates using a control clock signal having a second frequency different from the first frequency. Moreover, the graphics memory arbiter 224 can be independently verified and independently designed (e.g., logically and physically designed). The definitive boundaries for the top-level modules result in quicker integration of all top-level modules of the SoC.

Note that some of the techniques described herein may include hardware operating in response to programmed instructions. Alternatively, techniques described herein may be performed by specific hardware components containing hard-wired logic such as state machines to perform operations or by any combination of programmed data processing components and hardware components. Thus, embodiments of the present invention may include software, data processing hardware, data processing system-implemented methods, and various processing operations, as described herein.

The description of the invention set forth herein is illustrative, and is not intended to limit the scope of the invention as set forth in the following claims. For example, while the invention has been described in an embodiment in which a graphics processing unit is included in the SoC, one of skill in the art will appreciate that the teachings herein can be utilized with other processing units (e.g., audio codecs or other suitable processing units) that issue non-coherent memory requests to a memory structure shared with one or more processing units that issue coherent memory requests. Variations and modifications of the embodiments disclosed herein, may be made based on the description set forth herein, without departing from the scope and spirit of the invention as set forth in the following claims.

What is claimed is:

1. A method of generating a merged memory request stream from a plurality of memory request streams comprising:
merging coherent memory requests into a first serial memory request stream; and
selecting, by a memory controller circuit, a memory request for placement in the merged memory request stream from at least the first serial memory request stream and a merged non-coherent memory request stream, the merged non-coherent memory request stream being at least partially based on an indicator of a previous memory request selected for placement in the merged memory request stream.

2. The method, as recited in claim 1, wherein the memory request selected for placement in the merged memory request stream is selected at least partially based on a plurality of a bus turnaround policy, a bandwidth allocation policy, and a page ownership policy.

3. The method, as recited in claim 1,
wherein the memory request selected for placement in the merged memory request stream is selected at least partially based on a bus turnaround policy,
wherein the bus turnaround policy at least partially bases eligibility for issue of the memory request on a current direction of a memory bus associated with the merged memory request stream and a time window associated with at least one of a requestor, request type, or priority class associated with the memory request.

4. The method, as recited in claim 1,
wherein the memory request selected for placement in the merged memory request stream is selected at least partially based on a bandwidth allocation policy,
wherein the bandwidth allocation policy at least partially bases eligibility for issue of the memory request on a source of the memory request and an associated number of outstanding memory requests.

5. The method, as recited in claim 1,
wherein the memory request selected for placement in the merged memory request stream is selected at least partially based on a page ownership policy,
wherein the page ownership policy at least partially bases eligibility for issue of the memory request on priority of a source of the memory request and current memory page owner information.

6. The method, as recited in claim 1, further comprising:
selecting a memory request for placement in the first serial memory request stream from at least a first coherent memory request stream and a second coherent memory request stream, the second coherent memory request stream being a speculative coherent memory request stream.

7. The method, as recited in claim 6, further comprising:
storing in a retry request queue requests of the first serial memory request stream ineligible for issue at least partially based on a memory page table associated with a memory circuit coupled to the memory controller circuit,
wherein the memory page table is updated based on the indicator of the previous memory request selected for placement in the merged memory request stream.

8. The method, as recited in claim 6, further comprising merging non-coherent memory requests into the merged non-coherent memory request stream based on an indicator of memory requests in the first coherent memory request stream and the indicator of a previous memory request selected for placement in the merged memory request stream.

9. The method, as recited in claim 1, wherein merging coherent memory requests into a first serial memory request stream includes merging a first coherent memory request stream, a second coherent memory request stream, and a retry memory request stream into the first serial memory request stream.

10. The method, as recited in claim 1, further comprising:
merging non-coherent memory requests into the non-coherent memory request stream at least partially based on the indicator of the previous memory request selected for placement in the merged memory request stream.

11. The method, as recited in claim 1, wherein the indicator of the previous memory request selected for placement in the merged memory request stream includes one or more of a chip select indicator, a memory bank indicator, a command indicator, a row indicator, and a source indicator.

12. The method, as recited in claim 1, wherein the selecting is based on the first serial memory request stream, the merged non-coherent memory request stream, and an output of a memory page table.

13. An apparatus comprising:
an arbitration unit configured to merge coherent memory requests into a first serial memory request stream; and
a memory controller circuit configured to select a memory request for placement in a merged memory request stream from at least the first serial memory request stream and a merged non-coherent memory request stream, the merged non-coherent memory request stream being at least partially based on an indicator of a previous memory request selected for placement in the merged memory request stream.

14. The apparatus, as recited in claim 13, wherein the memory request selected for placement in the merged memory request stream is selected at least partially based on a plurality of a bus turnaround policy, a bandwidth allocation policy, and a page ownership policy.

15. The apparatus, as recited in claim 13,
wherein the memory request selected for placement in the merged memory request stream is selected at least partially based on a bus turnaround policy,
wherein the bus turnaround policy at least partially bases eligibility for issue of the memory request on a current direction of a memory bus associated with the merged memory request stream and a time window associated with at least one of a requestor, request type, or priority class associated with the memory request.

16. The apparatus, as recited in claim 13,
wherein the memory request selected for placement in the merged memory request stream is selected at least partially based on a bandwidth allocation policy,
wherein the bandwidth allocation policy at least partially bases eligibility for issue of the memory request on a source of the memory request and an associated number of outstanding memory requests.

17. The apparatus, as recited in claim 13,
wherein the memory request selected for placement in the merged memory request stream is selected at least partially based on a page ownership policy,
wherein the page ownership policy at least partially bases eligibility for issue of the memory request on priority of a source of the memory request and current memory page owner information.

18. The apparatus, as recited in claim 13, further comprising:
a select unit configured to select a memory request for placement in the first serial memory request stream from at least a first coherent memory request stream and a second coherent memory request stream, the second coherent memory request stream being a speculative coherent memory request stream.

19. The apparatus, as recited in claim 18, further comprising:
a retry request queue configured to store requests of the first serial memory request stream ineligible for issue at least partially based on a memory page table associated with a memory circuit coupled to the memory controller circuit,
wherein the memory page table is updated based on the indicator of the previous memory request selected for placement in the merged memory request stream.

20. The apparatus, as recited in claim 18, wherein the merged non-coherent memory request stream is based on an indicator of memory requests in the first coherent memory request stream and on the indicator of a previous memory request selected for placement in the merged memory request stream.

21. The apparatus, as recited in claim 13, wherein the arbitration unit is configured to merge a first coherent memory request stream, a second coherent memory request stream, and a retry memory request stream into the first serial memory request stream.

22. The apparatus, as recited in claim 13, further comprising:
an arbiter configured to merge non-coherent memory requests into the non-coherent memory request stream at least partially based on the indicator of the previous memory request selected for placement in the merged memory request stream.

23. The apparatus, as recited in claim 13, wherein the indicator of the previous memory request selected for placement in the merged memory request stream includes one or more of a chip select indicator, a memory bank indicator, a command indicator, a row indicator, and a source indicator.

24. The apparatus, as recited in claim 13, wherein the selecting is based on the first serial memory request stream, the merged non-coherent memory request stream, and an output of a memory page table.

* * * * *